Dec. 10, 1957     O. W. SCHROEDER     2,815,607
PROCESS AND APPARATUS FOR THE CULTURE OF PHOTO-SYNTHETIC
MICRO-ORGANISMS AND MACRO-ORGANISMS, PARTICULARLY ALGAE
Filed Nov. 26, 1954
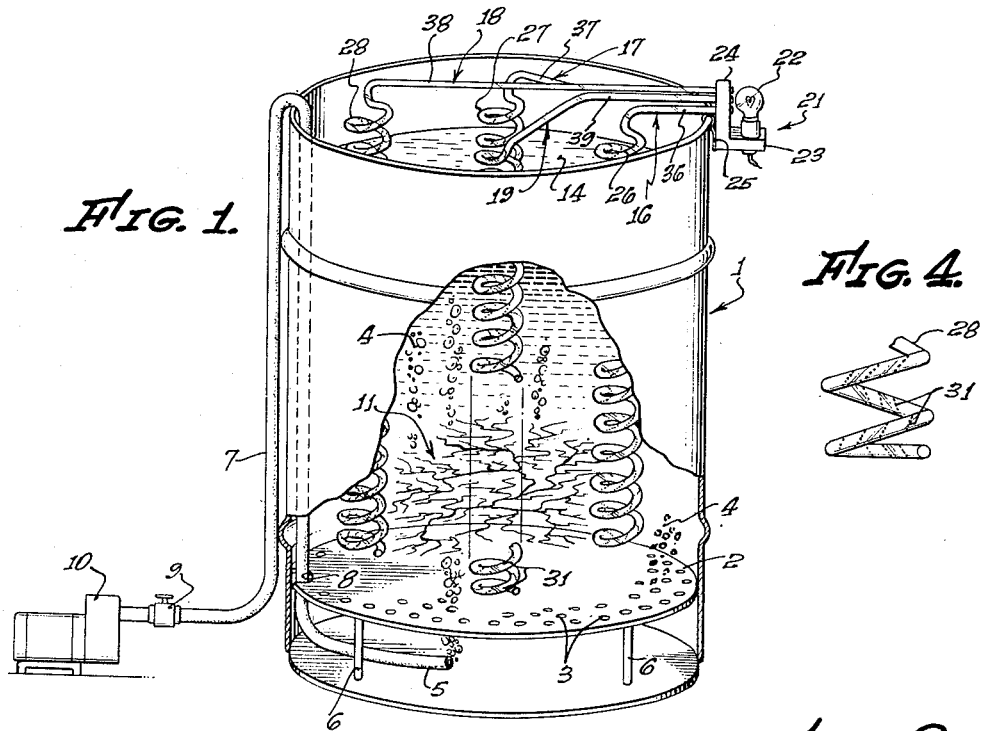
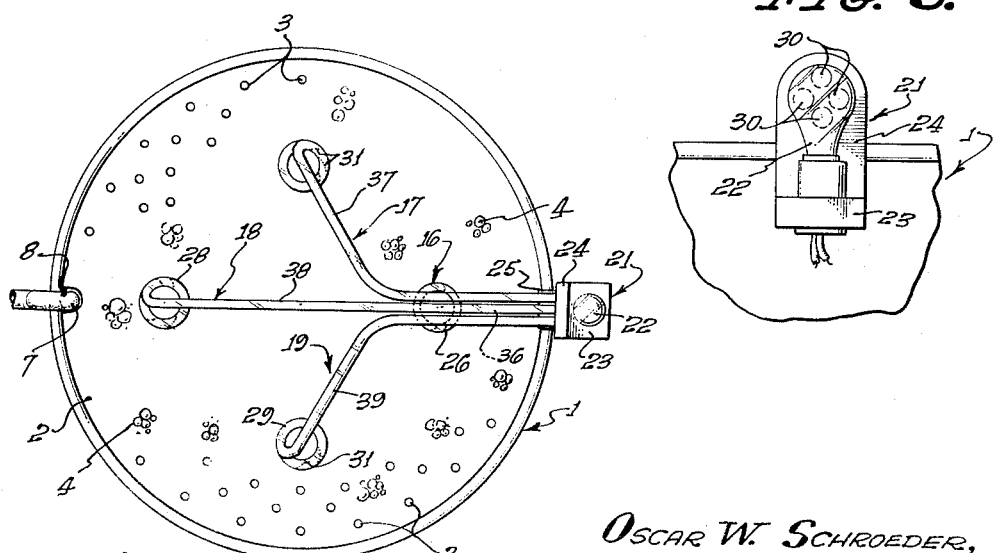
OSCAR W. SCHROEDER,
INVENTOR.
BY
W. W. Beatty
ATTORNEY.

United States Patent Office 2,815,607
Patented Dec. 10, 1957

2,815,607

PROCESS AND APPARATUS FOR THE CULTURE OF PHOTO - SYNTHETIC MICRO - ORGANISMS AND MACRO - ORGANISMS, PARTICULARLY ALGAE

Oscar W. Schroeder, Los Angeles, Calif., assignor of twenty percent to William E. Beatty, Los Angeles, Calif.

Application November 26, 1954, Serial No. 471,361

9 Claims. (Cl. 47—58)

This invention relates to process and apparatus for growing or culturing photosynthetic micro-organisms and macro-organisms, particularly algae.

An example of a micro-organism which may be used is the algal species *Chlorella pyrenoidosa*.

An example of a macro-organism which may be used is the *Chlorophyta Enteromorpha clathrata*, further identified pages 48 to 52 of the book "Marine Algae of the Monterey Peninsula California" by Gilbert M. Smith, published 1943 by Stanford University Press, Stanford University, California. That book also describes various other algae which multiply vegetatively by fragmentation and such other algae may also be used. According to reports this alga is found in all oceans especially in tide water creeks or bays where fresh water feeds into such creeks or bays.

The above mentioned species of Enteromorpha may have any of the well-known uses such as food and fertilizer, or the chemicals therein may be extracted, or it may be used for other purposes.

The generally recognized problem is to grow material of this type in quantities and with an efficiency of operation such that the production is on an economical basis. Some steps along this line are described in the book entitled "Algal Culture" by John S. Burlew, published 1953 by the Carnegie Institution of Washington. This describes certain large scale apparatus and particularly on pages 273 to 281 describes a pilot plant used in Japan wherein the growth unit included an open concrete trough, in order to admit sufficient light to the culture medium. The last mentioned book also describes other pilot plants and units wherein use was made of plastic tubes as the conduit or container for the culture medium, so as to admit sufficient light to the culture medium. The tubes are rather small in size. The disadvantage of a trough or a shallow container is that it not only takes up too much floor space but also the culture medium heats, requiring cooling. This cooling is necessary because particularly with regard to cold water algae, oxygen becomes a limiting factor as the amount of oxygen dissolved in the water is inversely proportional to its temperature and a certain publication has described that this is the reason why no algae of certain types are found in the Gulf of California where the temperature of the water exceeds the temperature of 20° C.

U. S. Patent No. 2,658,310 to B. M. Cook, as well as other publications, refers to the fact that batch methods have not been suitable for large scale commercial use. The reason for this as described in the above book "Algal Culture" is that as the algae grows, the thallus or micro-organisms in the upper portion of a deep container prevent the admission of light to the plant or organism below, with the result that the shaded plant or organism does not grow as it does not receive the light necessary for photosynthesis.

An object of the present invention is to admit light throughout the culture medium in a deep container whereby photosynthesis can proceed throughout the culture medium in a deep container. This has the advantage of conserving floor space and reducing or eliminating the overheating as encountered with thin layers of culture medium.

The apparatus described herein has been employed to grow the above mentioned species of Enteromorpha in quantities which are very large in proportion to the production data given in the above book "Algal Culture" particularly at the bottom of page 280.

It has been reported that it would take several years to find out whether contamination would prevent growing algae successfully and for that reason a closed system operating on a continuous basis was developed by others for Chlorella. On the other hand, I have grown large quantities rapidly of the Enteromorpha species above identified, with the open batch apparatus described herein, without any attempt to mtaintain sterile conditions. Contamination itself is no problem for the following reasons. If the product is desired for human consumption for use as food or drugs, the seaweed can be sterilized at the same time it is dried by using a bank of infra-red lamps and ultra-violet lamps, followed by chemical sterilization. On the other hand, if the product is to be used for certain industrial processes such as fertilizer, outside of the field of human consumption, contamination is of no consequence.

Under conditions of favorable temperature and sunshine, out of doors in California in the wintertime I have stocked several 50 gallon barrels each about one-sixth full of the above Enteromorpha which was harvested from its habitat, and without any heating or cooling equipment, I have grown each of the barrels to full and overflowing in two days' time. The remainder of each barrel when stocked was of course filled with water and nutrients.

It is believed that the reason for this large growth is due partly to the choice of an alga which multiplies vegetatively by fragmentation of the thallus, and particularly to the provision for illuminating the culture medium throughout the volume of a deep container as described and claimed herein.

Use is made of certain other factors which are now well known as being favorable to growth, these last mentioned factors including the use of urea as a source of nitrogen for the reason that it has little effect on the pH of the solution as pointed out in "Algal Culture" and the use of growth-promoting factors present in the soil in which the seaweed is growing, as disclosed pages 19 to 21, 25, 78, and elsewhere in the book entitled "The Culturingof Algae" published 1950 by the Charles F. Kettering Foundation and edited by Jules Brunel et al. This book is a symposium of various papers.

Referring in detail to the drawings,

Fig. 1 is a perspective view of culture apparatus for the process of the present invention, with a part of the container broken away.

Fig. 2 is an enlarged top plan view of the apparatus of Fig. 1.

Fig. 3 is an enlarged end view in elevation of the bracket and light assembly shown in Figs. 1 and 2, with parts broken away.

Fig. 4 is a side view in elevation of a portion of one of the light emitting rods shown in Figs. 1 and 2, a portion of the rod being broken away.

Referring to the drawings, the liquid culture medium 14 and the alga 11 together with certain nutrients later described, are contained in a container 1. Container 1 may be transparent although it may also be opaque, as I have used both a 50 gallon wooden barrel and a 50 gallon iron drum for this container. In container 1 is a false bottom 2 having a series of apertures 3 so as to provide a series of streams 4 of air as a source of oxygen and carbon dioxide from the outlet 5. The false bottom 2 is supported by suitable legs indicated at 6 and the outlet 5 is arranged below the false bottom 2. The outlet 5 is the discharge end of a conduit which may be a rubber tubing indicated at 7 and this extends through an aperture 8 at one side of the false bottom. The conduit 7 extends over the top of the container as shown and is connected to an air pump 10 driven by a motor as shown. The amount of discharge from a pump 10 is controlled by a valve 9. A supplementary source of carbon dioxide may be fed into the conduit 7, reports indicating that benefits are derived if the carbon dioxide content is increased to 5%. While this may be used, I have found it unnecessary for my purpose and the pump 10 may be taken simply as an air pump.

While the above mentioned Chlorella may be used as the stock indicated at 11, I prefer to use the macroscopic alga, Enteromorpha, referred to above. The amount of stock may be one handful per gallon, more or less.

I may use the Enteromorpha above mentioned, when it is not fruiting, although greater growth is obtained when it is fruiting, namely when the alga is emitting zoospores which form microscopic plants known as cysts, some of which issue non-motile eggs, other of which issue motile zoids, such eggs and zoids being referred to as gametes, the latter fertilizing and producing zygospores, which develop into the mother Enteromorpha plants. In other words, I can grow and in fact have grown the culture while some or all phases of this double generation life cycle are taking place. As the zoospores issue without the necessity for previous fertilization, the first generation is asexual whereas the second generation is sexual.

In order to provide the light necessary for copious growth, the container 1 is provided with a series of means for emitting light throughout the deep body of the culture medium 14. This means is here illustrated as four rods 16, 17, 18 and 19 of Lucite or similar light conducting material. These rods have spiral portions 26, 27, 28 and 29, respectively and horizontal arm portions 36, 37, 38 and 39 respectively. The outer ends 30 of these rod arms 36 to 39, as indicated in Fig. 3, are held in the upright rod support portion 24 of a bracket and light assembly 21. The assembly is provided with a hook 25 to removably support it on the edge of the container 1. The assembly 21 is provided with a bulb bracket portion 23 which supports an electric lamp 22 opposite the ends 30 of the rods 26 to 29. The lamp 22 may be a 40 watt bulb although other sizes may be used. Lamp 22 is connected to the usual 110 volt circuit not shown.

Each of the spiral rod portions 26 to 29 has a spiral array of nicks indicated at 31 in Fig. 4 so as to render the surface of the rod discontinuous so that light conducted along it is emitted at each of the nicks. The pitch of the spirals 26 to 29 as well as the pitch of the nicks 31 is large so that adjacent convolutions are spaced apart whereby the rod spiral is spaced both laterally and longitudinally with respect to the axis of each spiral and whereby the light emitting elements or nicks are spaced both laterally and longitudinally with respect to the rod portions on which they are arranged. As a result of this, each of the rods 16 to 19 emits light throughout a large volume of water in many directions which are both laterally and longitudinally spaced from each other.

Preferably I make the rods 16 to 19 by taking a straight rod, providing the nicks 31 with a file or otherwise while the rod is straight, then heating it so as to soften it and bend it into the spiral form shown at 26 to 29 and with the laterally extending portions 36 to 39 so that the outer ends 30 of all rods can be brought in close relation where they can be mounted in the bracket 24 opposite the lamp 22.

The nicks 31 may be polished if desired, but I have found this unnecessary as the straight rod can be turned about its axis and advanced lengthwise against a fine grain grinding wheel to make nicks which are smooth.

As a result of this construction, light is emitted in numerous directions and at numerous places throughout substantially the whole body of the deep culture medium 14.

The use of this apparatus is not dependent on any nutrient formula and any of the formula given in the above mentioned book "Algal Culture" may be used. My preference is for a formula which is simple, wherein nitrogen is derived from urea, wherein the pH of the solution is maintained on the acid side by the use of sulphuric acid, wherein sea water or tap water plus sodium chloride and a small amount of iodine and bromine are used and wherein use is also made of the substratum or soil where the Enteromorpha is found growing, and wherein use is also made of some sand preferably Pacific coast sand which contains a large amount of magnetic iron oxide. However, I can use other types of acids such as acetic or nitric and can use other chlorides (aluminum or potassium) instead of salt. Also I can use as a source of acid or as a supplement, a mixture of dry or wet citrus or orange pulp, as this contains citric acid and benefits the growth. Also the acid condition may be derived solely from the $CO_2$ feed and the supply for the container per gallon may comprise items in the following proportions: 1½ pt. tap water, ½ oz. Enteromorpha, ½ teaspoon urea (or ¼ oz. 2% ammonia), 2 teaspoons mud or substratum where Enteromorpha grows in nature. Such mud contains sodium chloride, calcium salts, phosphorus salts, soluble iron magnetic iron oxide, also magnesium salts, bromine and iodine. The mud thus supplies the minerals for growth although such minerals may be specially provided.

As described in the book "Algal Culture," iron is a limiting factor, the problem being to maintain it in solution so it will be available to the plant. The reason that I prefer to use an iron container, preferably one which is rusty, or sand containing magnetic iron oxide, is that such iron oxide in the presence of the sulphuric acid or other acid is the medium, which medium also contains salt, resulting in hydrochloric acid, is so that the sulphuric and hydrochloric acids constantly act on the otherwise insoluble iron oxide to produce nascent soluble chloride and sulphate of iron.

The depth of the culture medium 4 may initially have a small height such as that corresponding to one-sixth of the height of the container, and as the algae grows, additional culture medium may be added gradually or step by step to increasingly submerge the light rods 16 to 19.

Sunlight or artificial light may be used for overhead lighting for the contents of container 1. Also the nicks 31 may be extended over the rod arms 36 to 39. Also the air supply 7 and lamp 22 may be shut off at night and well-known devices for heating and/or cooling the culture medium may be provided.

Various modifications may be made in the invention without departing from the spirit of the following claims.

I claim:

1. The process of growing algae which comprises the steps of providing a deep container, supplying in said container a deep liquid culture medium having nutrients therein, stocking said culture medium with a supply of algae, and illuminating said medium throughout the body thereof from numerous positions laterally and vertically spaced from each other within the body of said medium while bubbling oxygen and carbon dioxide through said medium.

2. The process according to claim 1 wherein said supply of algae is a macroscopic mass increasingly vegetatively by fragmentation.

3. The process according to claim 1 wherein said supply of algae is Enteromorpha clathrata.

4. The process according to claim 1 wherein said alga is macroscopic and in the fruiting stage.

5. An apparatus for culturing algae comprising a container of culture medium and algal stock, said container having a false bottom having a series of apertures, a conduit for admitting air under pressure below said bottom, a light conducting device in said medium above said bottom, said device having surface discontinuity providing laterally and longitudinally spaced light emitting portions, said device having an outer end portion, means supporting said end portion, and an electric lamp adjacent said end portion.

6. An apparatus according to claim 5, said light emitting portions comprising nicks in said device.

7. An apparatus according to claim 5, said device comprising a rod having a spiral portion, and said light emitting portions comprising a spiral array of nicks in said spiral rod portion.

8. An apparatus for culturing algae comprising a container of culture medium and algal stock, said container having a false bottom having a series of apertures, a conduit for admitting air under pressure below said bottom, a plurality of spaced light conducting rods, each of said rods having a spiral portion in said medium above said bottom, said spiral portions each having surface discontinuities providing light emitting portions facing in different directions, said rods each having an outer end portion, a bracket supporting said spiral portions in spaced relation in said medium and said bracket supporting said outer end portions in close spaced relation outside of said medium and an electric lamp adjacent said outer end portions.

9. An apparatus for culturing algae comprising a container of culture medium and algal stock, said container having a false bottom having a series of apertures, a conduit for admitting air under pressure below said bottom, a plurality of spaced light conducting rods, each of said rods having an array of laterally and longitudinally spaced light emitting elements in said medium, said rods each having an outer end portion, a bracket supporting said end portions in close spaced relation, and an electric lamp adjacent said end portions.

References Cited in the file of this patent

UNITED STATES PATENTS

| | | |
|---|---|---|
| 2,040,264 | Mancini | May 12, 1936 |
| 2,140,972 | Rylsky | Dec. 20, 1938 |
| 2,316,589 | Iwanowicz | Apr. 13, 1943 |
| 2,480,178 | Zinberg | Aug. 30, 1949 |

OTHER REFERENCES

"Algal Culture" (Burlew), published July 15, 1953, by Carnegie Institution of Washington, D. C., as Publication No. 600. Pages 135–138, 144, 145, 301.

Journal of Cellular and Comparative Physiology, vol. 21, No. 3, pages 327–338 (June 1943). "The Mineral Composition of Chlorelle . . ." by Scott.

Modern Plastics, vol. 23, No. 12, pages 123–127 (August 1946). "Piping Light . . ." by Pearson.

"C-Well Illuminated Muddler," published before February 8, 1949, by Alcorn and Co., Boston, Mass. One page.

Journal of Cellular and Comparative Physiology, vol. 33, No. 3, pages 267–279. "The Growth and Optimum Yields . . ." by Ketchum et al. (June 1949.)